United States Patent [19]

Kageyama et al.

[11] Patent Number: 4,675,208
[45] Date of Patent: Jun. 23, 1987

[54] COATING METHOD AND APPARATUS

[75] Inventors: Takashi Kageyama, Hino; Makoto Yoshida, Nagareyama, both of Japan

[73] Assignee: Konishiroku Photo Industry Co., Ltd., Tokyo, Japan

[21] Appl. No.: 682,895

[22] Filed: Dec. 18, 1984

[30] Foreign Application Priority Data

Dec. 29, 1983 [JP] Japan .................................. 58-249512

[51] Int. Cl.$^4$ ........................... B05D 5/12; B05C 3/02
[52] U.S. Cl. .................................... 427/128; 118/259;
118/410; 118/411; 156/244.11; 156/244.21;
264/212; 264/176.1; 427/345; 427/430.1;
427/434.2; 427/434.5
[58] Field of Search .............. 427/177, 128, 345, 428,
427/430.1, 434.2, 434.5, 430.5; 118/410, 411,
259; 264/176 R, 212; 156/244.11, 244.21

[56] References Cited

U.S. PATENT DOCUMENTS

| 3,413,143 | 11/1968 | Cameron et al. | 118/411 |
| 4,358,484 | 11/1982 | Alheid | 427/296 |
| 4,440,809 | 4/1984 | Vreeland | 118/410 |

Primary Examiner—Norman Morgenstern
Assistant Examiner—Janyce A. Bell
Attorney, Agent, or Firm—Jordan B. Bierman

[57] ABSTRACT

A coating method wherein a part of coating liquid supplied from a liquid supplying device is circulated through a closed passage running somewhere between the liquid supply device and a liquid delivery nozzle of a liquid applying section from the liquid applying section to the liquid supply device while the coating process is in operation. The amount of liquid circulated in the closed passage is 0.5 to 10 times the amount of liquid supplied by the liquid supply device.

12 Claims, 11 Drawing Figures

PRIOR ART FIG. 3
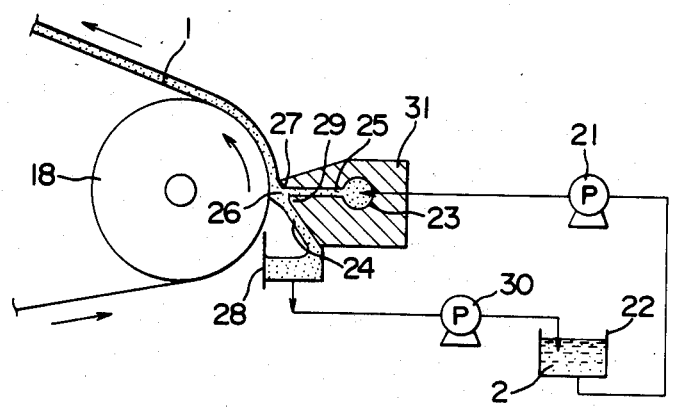
PRIOR ART FIG. 4
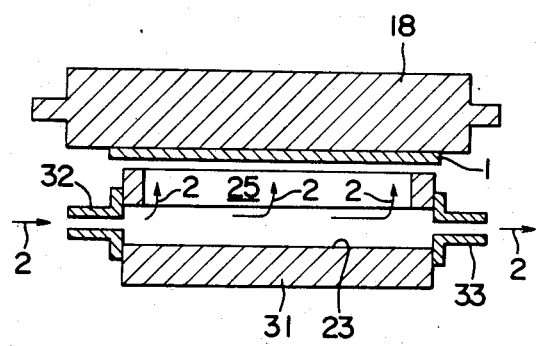

COATING METHOD AND APPARATUS

BACKGROUND OF THE INVENTION

1. Field of the Invention

This invention relates to a coating method and apparatus which is suited for forming magnetic coating on magnetic recording mediums.

2. Description of the Prior Art

In the conventional equipment for producing magnetic recording medium such as magnetic tape, a substrate or tape base 1, as shown in FIG. 1, is fed from a supply roll 10 and is applied with magnetic coating by the known coating applier of the extrusion type. The coated tape is then sent into a dryer 12 where it is dried by hot air 14 blown from nozzles 13. Next, the tape 1 coated with magnetic layer is calendered by known calender rolls 15 and, after coating it with a black coat if necessary, is wound on a take-up roll 16.

In this case the tape 1 is continuously made to run while being supported by a backup roll 18. A coating roll 17 is pressed against the backup roll 18. The coating liquid delivered from an extrusion type coating applier 11 onto the coating roll 17 is controlled to the desired thickness by a metering roll 19 and transferred onto the tape 1 running on the backup roll 18. This technique of magnetic coating is known as the reverse roll method disclosed in Japanese Patent Laid-Open Nos. 84242/1977 and 17661/1981.

FIG. 2 shows the detail of the magnetic liquid applying section using the reverse roll method. More coating liquid 2 than is needed is applied to the coating roll 17 from the liquid applier 11. The metering roll 19 is so located that it contacts the coating roll 17 at a point before the liquid on the coating roll reaches the backup roll 18. The metering roll 19 scrapes excess liquid off the coating roll 17 to control the amount of liquid to be transferred to the tape. The excess liquid 2 is collected in a container 3 from which it is circulated by a pump 4 to a reservoir 5 and further fed to the applier 11 by a pump 6. This liquid circulating system has disadvantages. For example, some foreign matter may get into the liquid while the liquid is staying in the container 3 causing abnormal liquid application; the composition and viscosity of the coating liquid may change while it is being circulated; also the particles may coagulate during circulation. These result in variation in the thickness and characteristic of the magnetic layer formed on the tape, deteriorating the quality and stability of the product.

Another known technique of magnetic coating is a gravure coating. This process is performed in a system which is exposed to the open air, so the coating liquid evaporates into the air changing the liquid composition and deteriorating the quality of the product. Moreover, the gravure pattern of the coating roll is subject to wear during operation, which results in a change in the coating thickness. This requires frequent replacement of the coating roll, reducing production efficiency.

In the extrusion coating method disclosed by the Japanese Patent Publicaton No. 10110/1981, the coating liquid 2 is supplied in volume several times more than necessary, as shown in FIG. 3, from the reservoir 22 to a chamber 23 of a liquid applier 31 by a pump 21. The liquid 2 fed into the chamber 23 is further supplied through a slot 25 to a nozzle 26 at the end of the slot where the liquid is controlled to the desired amount by a doctor edge 27 which is mounted immediately after the nozzle 26 with respect to the tape running direction. The regulated amount of coating liquid is applied onto the tape 1 running in the direction of the arrow. The thickness of the coating is about one-half of the gap between the doctor edge 27 and the tape 1. The excess liquid 2 flows down, as shown at 24, by gravity through a larger gap between the tape 1 and the edge 29 which is mounted on the tape-incoming side of the nozzle 26. The excess liquid 2 thus collected in the reservoir 28 is then supplied by a pump 30 to the reservoir 22. However, since the excess is recovered to a reservoir 28 and then to the tank 22, the system shown in FIG. 3 has similar drawbacks to those of FIG. 2 such as change in liquid composition, coagulation, and viscosity variation.

To remove these drawbacks, it has been proposed that in the extrusion coating system, only the exact amount of liquid necessary to form a specified thickness of coating on the tape is extruded (that is, in FIG. 3, the liquid amount is reduced to eliminate the excess). In this case, however, fine longitudinal streaks like the wood grain of lauan are formed on the surface of the coated layer, appearing from near the nozzle of the liquid applier.

The extrusion coating system published in the Japanese Patent Laid-Open No. 19060/1982 has been devised to remove the longitudinal streaks on the surface of the coated layer. According to this, as shown in FIG. 4, the coating liquid 2 is introduced from a supply nozzle 32 into the liquid chamber 23 in the liquid applier while at the same time a part of the liquid 2 is discharged from a discharge nozzle 33 at the other end of the applier. The amount of liquid supplied to the chamber 23 is greater than that coated on the tape and the excess liquid is discharged from the nozzle 33. So it is considered that the streaks will not result. Although there is no description as to the process of the liquid after being discharged from the nozzle 33, the excess liquid is considered to be circulated and recovered to the reservoir or discarded. If the liquid is circulated for reuse, the aforementioned drawback is not overcome at all. And if it is thrown out, the loss of liquid will inevitably increase cost.

SUMMARY OF THE INVENTION

The object of this invention is to provide a coating method and apparatus that can form a uniform coating on the tape at high efficiency while at the same time keeping the liquid composition and viscosity stable and preventing coagulation of particles.

In other words, this invention relates to a coating liquid application method in which the exact amount of liquid to be applied onto the tape is supplied from the liquid supply means and a part of the coating liquid is circulated in a closed system between the supply means to the liquid delivery nozzle of the liquid application section.

This invention further provides a coating apparatus which embodies the above coating method effectively and consists of: a coating liquid application section having a liquid delivery nozzle; a liquid supply means; a pipe introducing the liquid from the supply means into the application section; and a circulation path branched from the liquid passage of the application section and connected to the pipe.

Other objects and features of this invention will become apparent from the description and drawings that follow.

BRIEF DESCRIPTION OF THE DRAWINGS

FIGS. 1 through 4 show examples of conventional coating apparatuses, of which;

FIG. 1 is a process flow diagram showing the magnetic coating process of the magnetic tape;

FIGS. 2 and 3 are simplified drawings showing two examples of coating apparatus; and FIG. 4 is a cross section of a coating liquid applier;

FIGS. 5 through 11 show embodiments of this invention, of which;

FIG. 5 is a simplified drawing of the coating liquid applier;

FIG. 6 is an enlarged view of essential part of FIG. 5;

FIG. 7 is a perspective view of the applier partially cut away;

FIGS. 8 and 9 are simplified drawings of other two examples of coating liquid applier; and FIGS. 10 and 11 are cross sections of the above two coating liquid appliers.

DESCRIPTION OF THE PREFERRED EMBODIMENT

The present invention will now be explained in detail by taking as examples the preferred embodiments.

Figure 1:
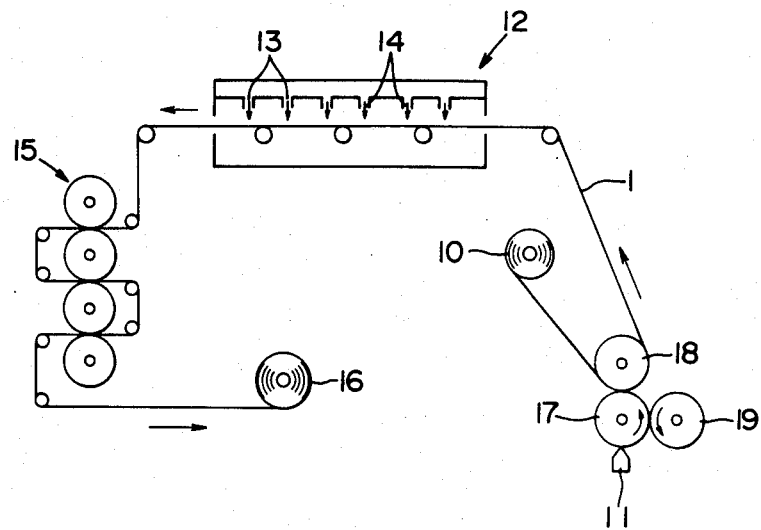
Figure 2:
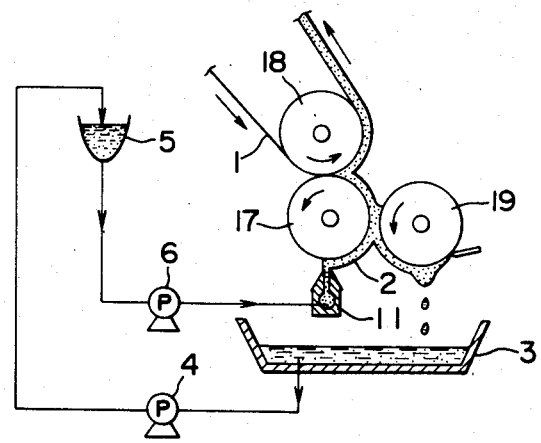

The coating method and apparatus embodying this invention are suited for manufacturing the magnetic tape and can be applied basically in a way similar to that applied in the process of FIG. 1.

Figure 5:
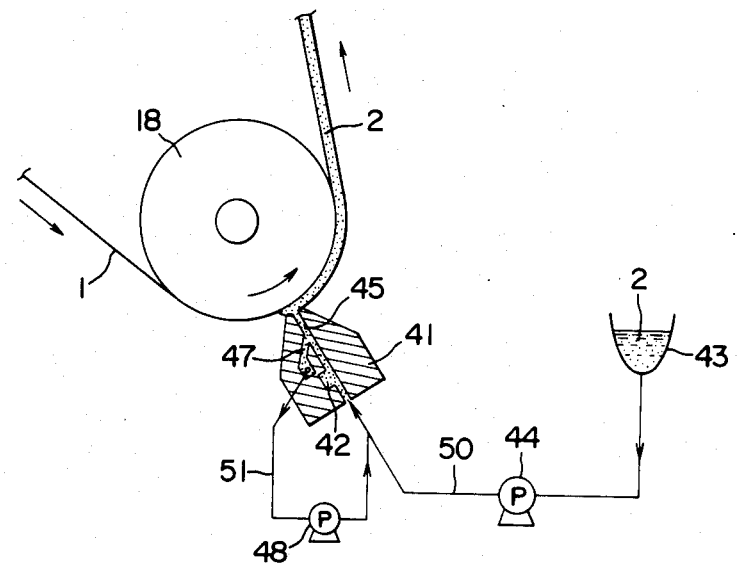
Figure 6:
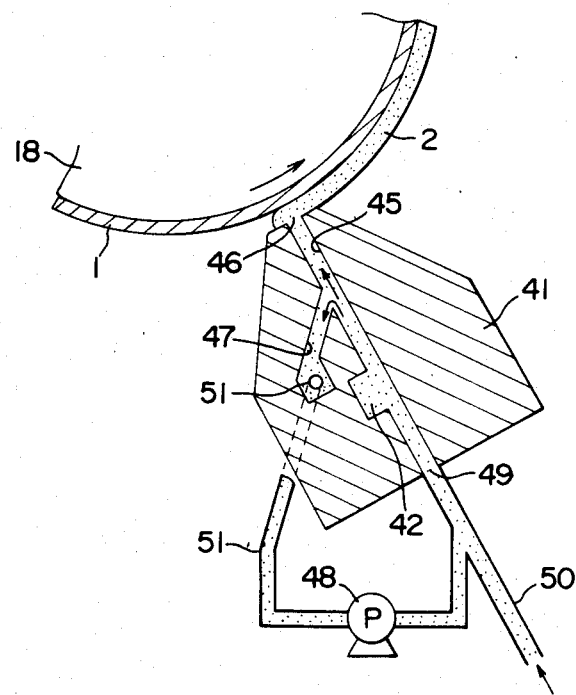
Figure 7:
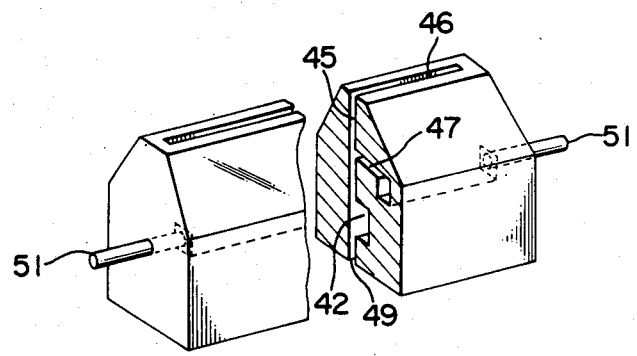

FIGS. 5 through 7 show the first embodiment of this invention.

In this embodiment, the coating liquid 2 is supplied from a reservoir 43 to a chamber 42 of an extrusion type liquid applier 41 by a pump 44. The liquid 2 is then fed through a slit 45 and a nozzle 46 onto the tape 1. The pump 44 delivers to the chamber 42 the exact amount of liquid that is to be coated on the tape 1.

The amount of liquid delivered to the chamber 42 is expressed as $$R = V \times hw \times W$$

(where V is the speed at which the tape travels; hw is the thickness of coating layer when still wet; and W is the width of coating layer.)

What should be noted here is that a circulation slit 47 is formed in an intermediate position of the slit 45 (that is, between the chamber 42 and the nozzle 46) to communicate with the slit 45 and that a part of the coating liquid 2 is drawn out through the slit 47 in the tape transverse direction by a pump 48 and is circulated back to the chamber 42 through the supply port of the liquid applier 41. Reference number 50 in the figure denotes a pipe to supply liquid from the reservoir 43 to a supply port 49. 51 is a pipe for liquid circulation. The amount circulated by the pump 48 is 1.2 to 1.4 times that delivered by the pump 44 and this circulation increases the speed of the liquid flow rate.

With the above method and apparatus, since the part of the liquid that has been taken from the slit 45 is circulated in the totally closed system, it is not returned to the reservoir 43 as is the case with the conventional apparatus. This prevents any change in the liquid composition and viscosity due to evaporation. If as with the conventional apparatus the liquid is returned to the reservoir 43, the shearing force between particles will be weakened while the liquid stays in the reservoir, resulting in coagulation. In this embodiment, this undesired phenomenon will not occur. Further, as the return liquid is added from pipe 51 to the main stream of the pipe 50, the liquid is always moving in the applier 41 and the mixing of the two flows of liquid causes turbulence which in turn keeps constant the composition of the liquid to be coated to the tape. Since there is difference in speed among particles, no coagulation of liquid will occur. Particles are subjected to the action of shearing force when passing through narrow slit 45 and at the joint of slits 45 and 47. So no coagulation of particles will occur.

Moreover, since the coating liquid in the applier 41 is circulated inside, the apparent volume of liquid used for coating is $V \times hw \times W$ and all of this liquid is coated onto the tape 1. This means that the thickness of the coating on the tape can be regulated only by the pump 44, which improves the coating thickness accuracy and facilitates the thickness control. Moreover, the internal circulation prevents the lauan grain-like streaks that occur when the coating liquid is supplied only in the volume of ($V \times hw \times W$), and also improves the electromagnetic characteristics of the magnetic recording medium, especially the chrominance S/N, RF output and frequency characteristic in the high frequency range. There is no particular limit to the amount of circulation flow by the pump 48, but it is desirable to set it at about 0.5 to 10 times the volume of ($V \times hw \times W$) (say 1.2 to 1.4 times that volume). Since any variation in the circulation flow is likely to result in a change in the coating thickness, it is desired that the pump 48 have very small flow variation, which is achieved by a pump such as the high accuracy external contact type gear pump with small delivery pulsation and good constant flow characteristic. This can also be said of the supply pump 44.

Figure 8:
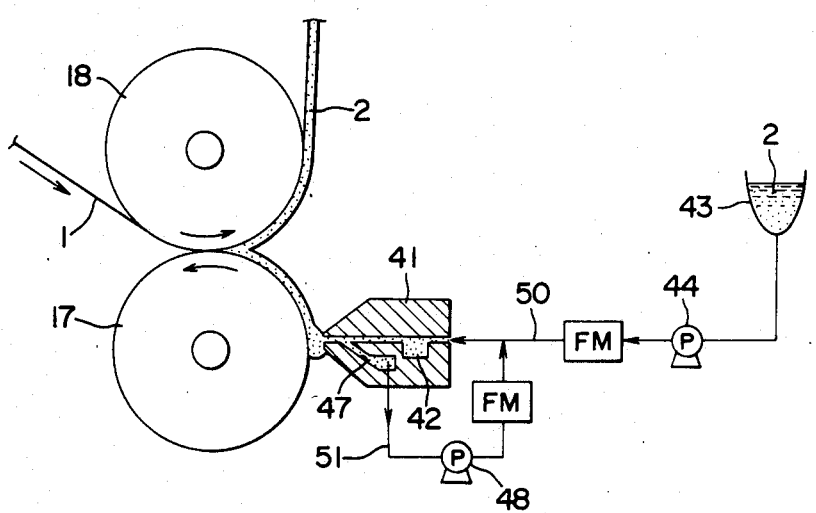

For further improvement of the coating thickness accuracy, a flow meter FM is provided on the delivery side of the supply pump 44 and the circulation pump 48 to control the rotating speed of the pumps, as shown in FIG. 8. In this example, the liquid is indirectly coated to the tape 1 through the applicator roll 17. The backup roll 18 or the applicator roll 17 is preferably an elastic roll.

Figure 9:
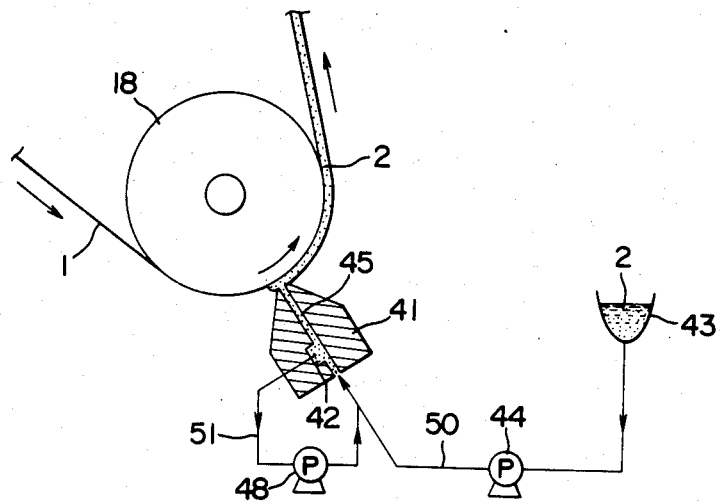
Figure 10:
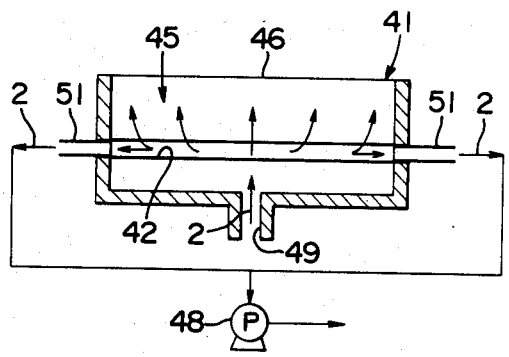

FIGS. 9 and 10 show still another embodiment of this invention.

Figure 11:
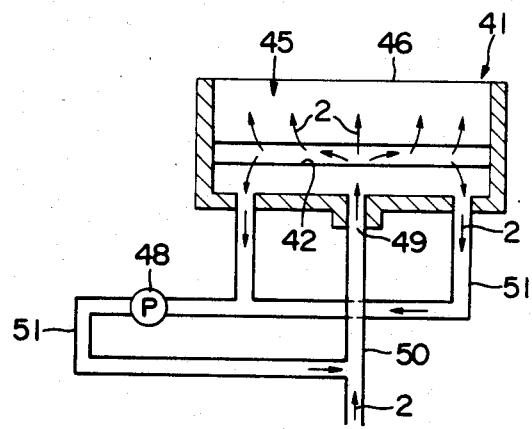

This example differs from the above example in that the excess liquid is drawn out from the chamber 42. The excess liquid is taken out from both ends of the chamber 42 and these two streams are combined and circulated by the pump 48 back to the chamber 42, as shown in FIG. 10. It is also possible, as shown in FIG. 11, to take a part of the liquid from the chamber 42 from different directions than those of FIG. 10.

Thus, the liquid applier 41 need not have a circulation slit 47. Also, the internal liquid circulation causes turbulence in the liquid flow (see FIGS. 10 and 11), generating shearing force in the liquid.

A more concrete explanation on the above embodiment is given in the following.

First, the coating liquid (magnetic coating liquid) with the following composition is prepared.

$\gamma$-$Fe_2O_3$: 100 parts weight

Vinyl chloride-vinyl acetate copolymer (VAGH produced by Union Carbide Corp.): 6 parts weight Nitrocellulose(Celluline L-200 produced by Daicel Ltd.): 6 parts weight Polyurethane (Estan 5701, produced by Goodrich Co.): 12 parts weight Lecithin: 5 parts weight Toluene: 30 parts weight
Cyclohexanone: 180 parts weight This coating liquid (about 2150 cp when measured by type B viscosity meter (60 rpm)) is applied continuously to the tape by the extrusion type liquid applier of FIG. 5 under the following condition.
Substrate: Polyethylene terephthalate
Width of the substrate: 360 mm
Thickness of the substrate: 14 μm
Coating speed: 150 m/minute
Width of coating layer: 340 mm
Thickness of coating layer (when wet): 35 μm
Volume of liquid supplied: 1785 cc/minute During the coating process, the liquid is extracted from the circulation slit 47 of FIG. 5 in the following four kinds of volume and circulated back to the applier. The condition of the coating obtained and the magnetic tape characteristic are as follows.

|  | Amount of circulated liquid (cc/min.) | Condition of coating (fine longitudinal streaks) | Luminance S/N (dB) | Chrominance S/N (dB) | RF output (dB) | Frequency characteristic (10 kHz) (dB) |
| --- | --- | --- | --- | --- | --- | --- |
| Test 1 | 0 | Many streaks occurred (all over the coating surface) | 43.5 | 38.0 | −27.3 | 0.8 |
| Test 2 | 500 | Few | 44.0 | 39.5 | −26.5 | 1.0 |
| Test 3 | 1000 | Very few | 44.0 | 40.8 | −26.0 | 1.7 |
| Test 4 | 2000 | None | 44.7 | 42.0 | −25.8 | 2.0 |

The above characteristics were measured under the following conditions.

Luminance S/N:

As a measurement signal, a 50% white signal was recorded and reproduced by video tape and was supplied to a color video noise meter 9250/1 (produced by Shibasoku Co.) to measure the noise level that remained after the signal was passed through the low range cut filter of 1 kHz and 10 kHz.

Chrominance S/N:

A 702 signal of 0.714 Vp-p was superimposed on a white signal of 0.36 Vp-p to produce a 100% color signal which was then recorded and reproduced. The bypass filter was set at 10 kHz and the low pass filter at 1 kHz, and AM noise and PM noise were measured.

RF output:

The FM output from the head was measured when a measurement was taken of luminance S/N.

Frequency characteristic:

The reproduce level was measured for the signal which had been recorded on the test tape with a specified vias current at a record level 10 dB lower than the specified voice level. This measurement was represented by the difference between the test tape and the standard tape.

These characteristics of magnetic tapes varied with elapse of time and this is shown below.

|  | Viscosity of liquid (cp) | Angular ratio | Luminance S/N (dB) | RF Output (db) |
| --- | --- | --- | --- | --- |
| 30 min. after liquid application | 2200 | 0.83 | 44.5 | −26.2 |
| 60 min. later | 2230 | 0.81 | 44.0 | −25.7 |
| 120 min. later | 2200 | 0.82 | 44.7 | −25.8 |

From these results, it is seen that supplying liquid in volume of 1785 cc/min. (which is determined by V×hw×W) and circulating the liquid will produce uniform coating on the tape without any longitudinal streaks and with improved electromagnetic conversion characteristic. It is also seen that there is almost no deterioration of characteristics with elapse of time.

It should be noted here that various modifications may be made to the above embodiments according to the technological concept of this invention.

For example, the way in which the coating liquid is extracted from the liquid applier may be changed. It may be extracted from one end of the applier, instead of from the both ends. The point into which the extracted liquid is circulated back need only be somewhere between the supply port (at 49 in the above embodiment) of the liquid applier and the supply pump (at 44). The application of this invention is not limited to the coating of magnetic recording mediums such as magnetic tape, but it is also applicable to various kinds of coating liquid.

As mentioned above, since the liquid is circulated through the closed path branching from the main liquid passage of the liquid applier, the liquid quality is kept from deterioration as may be caused by evaporation and no coagulation will occur, forming uniform coating on the tape without any undesired streaks. Moreover, the liquid circulation can be regulated by controlling the liquid supply means to enable liquid coating of constant volume, which in turn assures high production efficiency.

We claim:

1. A method for coating running lengths of substrate comprising supplying a magnetic coating liquid in a main stream in an amount substantially equal to that needed for said coating from a liquid supply means, and withdrawing part of said liquid through a passage closed to the atmosphere, said passage extending from a first point between said supply means and a liquid delivery nozzle of a coater.

2. The method of claim 1 wherein said liquid is recirculated to a second point between said supply means and said first point.

3. The method of claim 1 in which the amount of liquid circulated in the passage is 0.5 to 10 times the amount of liquid supplied by the supply means.

4. The method of claim 2 wherein said liquid is withdrawn in a direction substantially transverse to the flow of the main stream.

5. The method of claim 1 wherein said substrate is guided by a first rotating member, substantially said amount of liquid is coated on a second rotating member, substantially all of said amount is coated onto said substrate, said substrate being held between said first and second rotating members which are pressed together with a pressing force and, during interruption of coating, said pressing force is released.

6. The method of claim 1 wherein said liquid delivery nozzle is part of an extrusion coater.

7. The method of claim 1 wherein said substrate is supported by only one roller and is positioned between said roller and said coater.

8. The method of claim 1 wherein said withdrawing is carried out with said liquid in turbulent flow.

9. A coating apparatus for a substrate comprising a liquid passage terminating in a liquid delivery nozzle, a liquid supply means, a pipe connecting the liquid supply means to the end of said passage remote from said liquid nozzle, and a circulating passage branched from a first point between said nozzle and said supply means.

10. The apparatus of claim 9 further comprising a single rotating member adapted to support and/or guide said substrate, said substrate being located between said single member and said coater.

11. The apparatus of claim 9 further comprising a first rotating member adapted to support and/or guide a substrate, a second rotating member pressed against the first rotating member with a pressing force with said substrate between them, said nozzle adapted to apply to the second rotating member the coating liquid in an amount substantially equal to that coated on the substrate, and a means to release the pressing force acting on the two rotating members.

12. The apparatus of claim 9 wherein said nozzle is part of an extrusion coater.

* * * * *